US010471907B2

(12) United States Patent
Zhou et al.

(10) Patent No.: US 10,471,907 B2
(45) Date of Patent: Nov. 12, 2019

(54) VEHICLE JACK BRACKET ASSEMBLY

(71) Applicant: Ford Global Technologies, LLC, Dearborn, MI (US)

(72) Inventors: Han Zhou, Jiangsu (CN); Brenna Liu, Jiangsu (CN); Naijiang Xu, Jiangsu (CN); Zhuang Xu, Jiangsu (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/899,158

(22) Filed: Feb. 19, 2018

(65) Prior Publication Data
US 2018/0236948 A1 Aug. 23, 2018

(30) Foreign Application Priority Data
Feb. 20, 2017 (CN) .......................... 2017 1 0090228

(51) Int. Cl.
*B60R 11/06* (2006.01)
*F16M 13/02* (2006.01)
*B66F 3/24* (2006.01)
*B60R 11/00* (2006.01)

(52) U.S. Cl.
CPC ............ *B60R 11/06* (2013.01); *F16M 13/02* (2013.01); *B60R 2011/0029* (2013.01); *B60R 2011/0036* (2013.01); *B60R 2011/0052* (2013.01); *B60R 2011/0059* (2013.01); *B66F 3/24* (2013.01)

(58) Field of Classification Search
CPC ............ B60R 11/06; B60R 2011/0059; B60R 2011/0071; F17C 13/084; B60K 15/07
See application file for complete search history.

(56) References Cited

U.S. PATENT DOCUMENTS

| 3,475,797 | A | * | 11/1969 | Rau ................... | A44B 11/2503 24/641 |
| 4,573,663 | A | * | 3/1986 | Nussbaum ............. | B66F 7/065 254/122 |
| 5,098,126 | A | | 3/1992 | Kanke et al. | |
| 5,810,309 | A | * | 9/1998 | Augustine ............. | B60K 15/07 248/154 |
| 8,919,597 | B2 | * | 12/2014 | Handa ................... | B60K 15/03 220/562 |

(Continued)

FOREIGN PATENT DOCUMENTS

| GB | 2318330 A | 4/1998 |
| JP | H02220939 A | 9/1990 |

(Continued)

*Primary Examiner* — Adam J Waggenspack
(74) *Attorney, Agent, or Firm* — Raymond L. Coppiellie; Burgess Law Office, PLLC

(57) ABSTRACT

A bracket assembly four securing a hydraulic jack in a vehicle. The bracket assembly including a base and two support walls opposite each other and extending outwardly from the base to support the hydraulic jack. The assembly includes a base band having a first end and a second end. The base band is disposed between the two support walls and is connected to the base. A first strap partially made from sheet metal has a fixed end and a free end with the fixed end of the first strap pivotably connected to a first end of the base band. The free end thereof detachably coupled to the second end of the base band via a locking device. The first strap and the base band secures the hydraulic jack on the two support walls.

19 Claims, 7 Drawing Sheets

(56) References Cited

U.S. PATENT DOCUMENTS

| | | | | |
|---|---|---|---|---|
| 9,821,729 B2* | 11/2017 | Zhou | ................... | B60R 11/06 |
| 2009/0114467 A1* | 5/2009 | Hoffman | ................ | B60K 15/07 180/313 |
| 2009/0134192 A1* | 5/2009 | Dossow | ................ | B60K 15/07 224/400 |

FOREIGN PATENT DOCUMENTS

| | | | |
|---|---|---|---|
| JP | 2013112148 | A | 6/2013 |
| KR | 20020046050 | A | 6/2002 |
| KR | 20000041776 | A | 7/2002 |
| KR | 20050060833 | A | 6/2005 |

\* cited by examiner

VEHICLE JACK BRACKET ASSEMBLY

CROSS-REFERENCE TO RELATED APPLICATIONS

Not Applicable.

BACKGROUND OF THE INVENTION

1. Field of the Invention

An assembly for securing a vehicle jack; and more specifically, a vehicle jack bracket assembly for securing a hydraulic jack in a motor vehicle.

2. Description of Related Art

Many motor vehicles include a jack as standard equipment for changing a tire. The jack is stored in the vehicle and removed when needed to lift the vehicle off of the ground to change a tire. Often the vehicle jack is stored in the trunk, near the spare tire. Some vehicles store the jack in a side compartment or under a rear seat. Typically, the vehicle jack is held down by a bracket or other mechanism that must be removed before you can access the jack.

A hydraulic jack is one type of widely used vehicle jack because it supports a heavy load and is easy to use. Various brackets or mechanisms exist for securing a hydraulic jack in a vehicle or jack compartment while efficiently utilizing vehicle space, including a screw mechanism or rubber band. These must be removed before accessing the jack.

SUMMARY OF THE INVENTION

A bracket assembly to secure a hydraulic jack in a vehicle including a base and two spaced apart support walls positioned opposite each other and extending from the base to support the hydraulic jack. The assembly further including a base band having a first end and a second end, wherein the base band is disposed between the two support walls and is connected to the base. A first strap has a fixed end and a free end with the fixed end pivotably connected to the first end of the base band. A locking device detachably couples the free end with the second end of the base band wherein the first strap and the base band secure the hydraulic jack on the two support walls.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
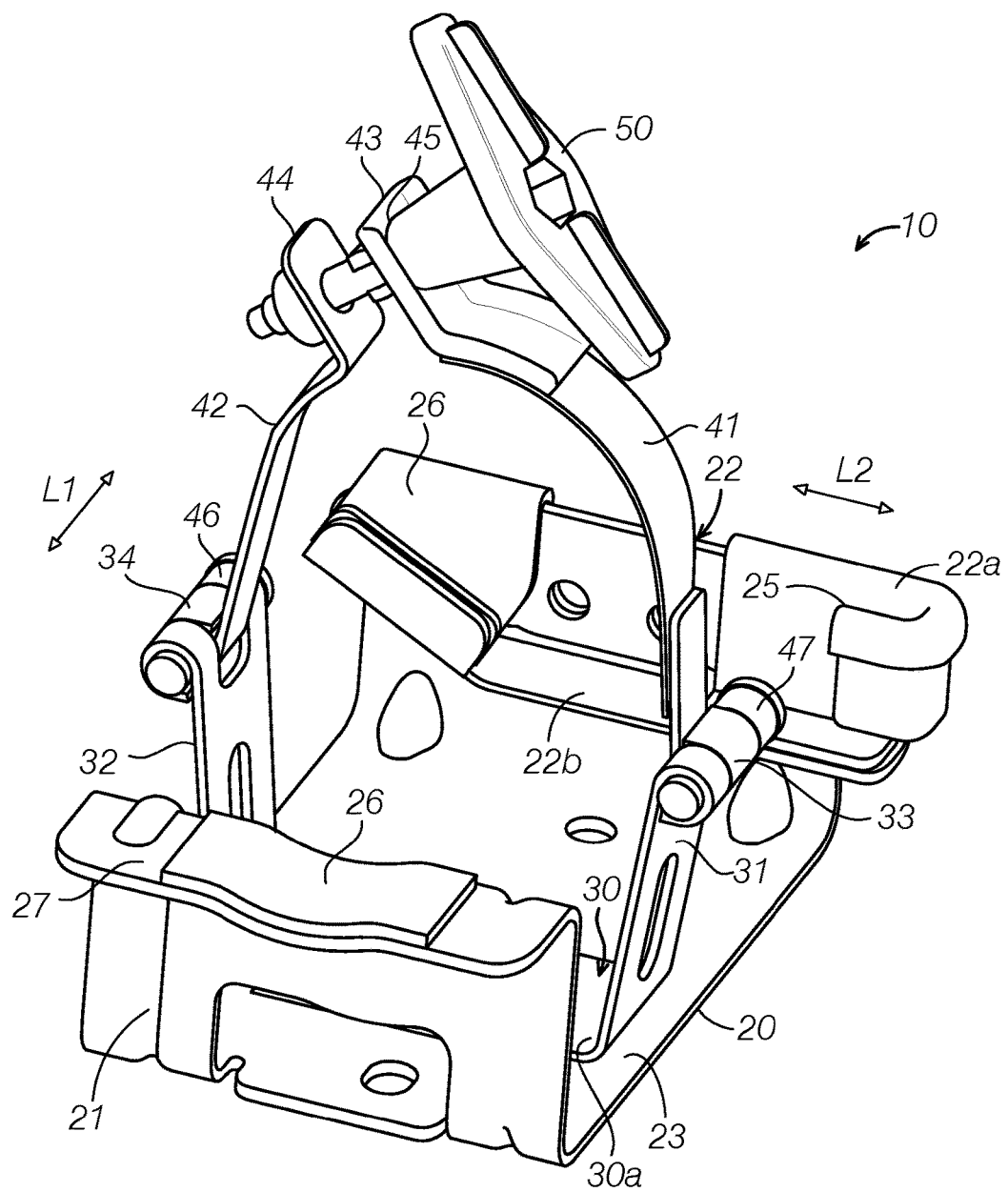
FIG. 1 is a perspective view of a bracket assembly for use with a hydraulic jack according to an embodiment of the present invention.

The following description of the preferred embodiment(s) is merely exemplary in nature and is in no way intended to limit the invention, its application, or uses.

The drawings illustrate the general characteristics of methods, structure or materials utilized in certain exemplary embodiments and supplement the detailed description. These drawings are not, however, to scale and may not precisely reflect the precise structural or performance characteristics of any given embodiment, and should not be interpreted as defining or limiting the range of values or properties encompassed by example embodiments. Using similar or identical reference numbers in the drawings indicates the presence of a similar or identical element or feature.

Throughout the following detailed description, examples of various bracket assemblies for a hydraulic jack in a vehicle are provided.

Figure 4:
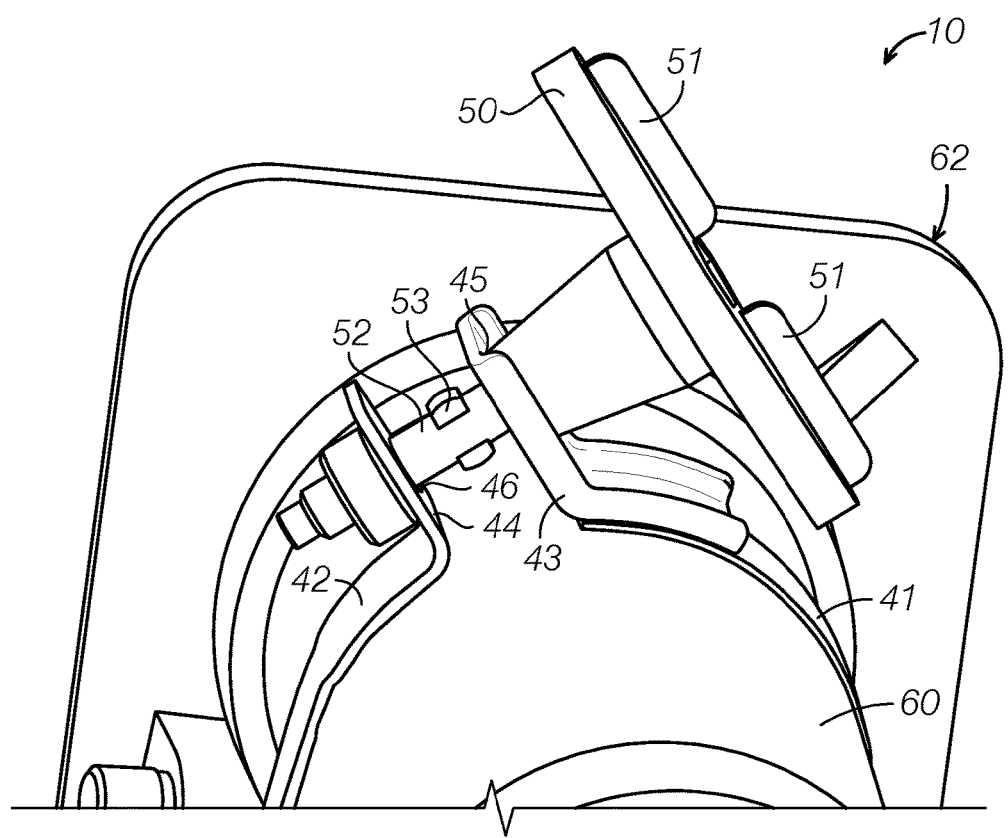
FIG. 4 is an enlarged partial view of the bracket assembly of FIG. 1, and a partial view of a hydraulic jack, illustrating the bracket assembly in a locked position.
Figure 5:
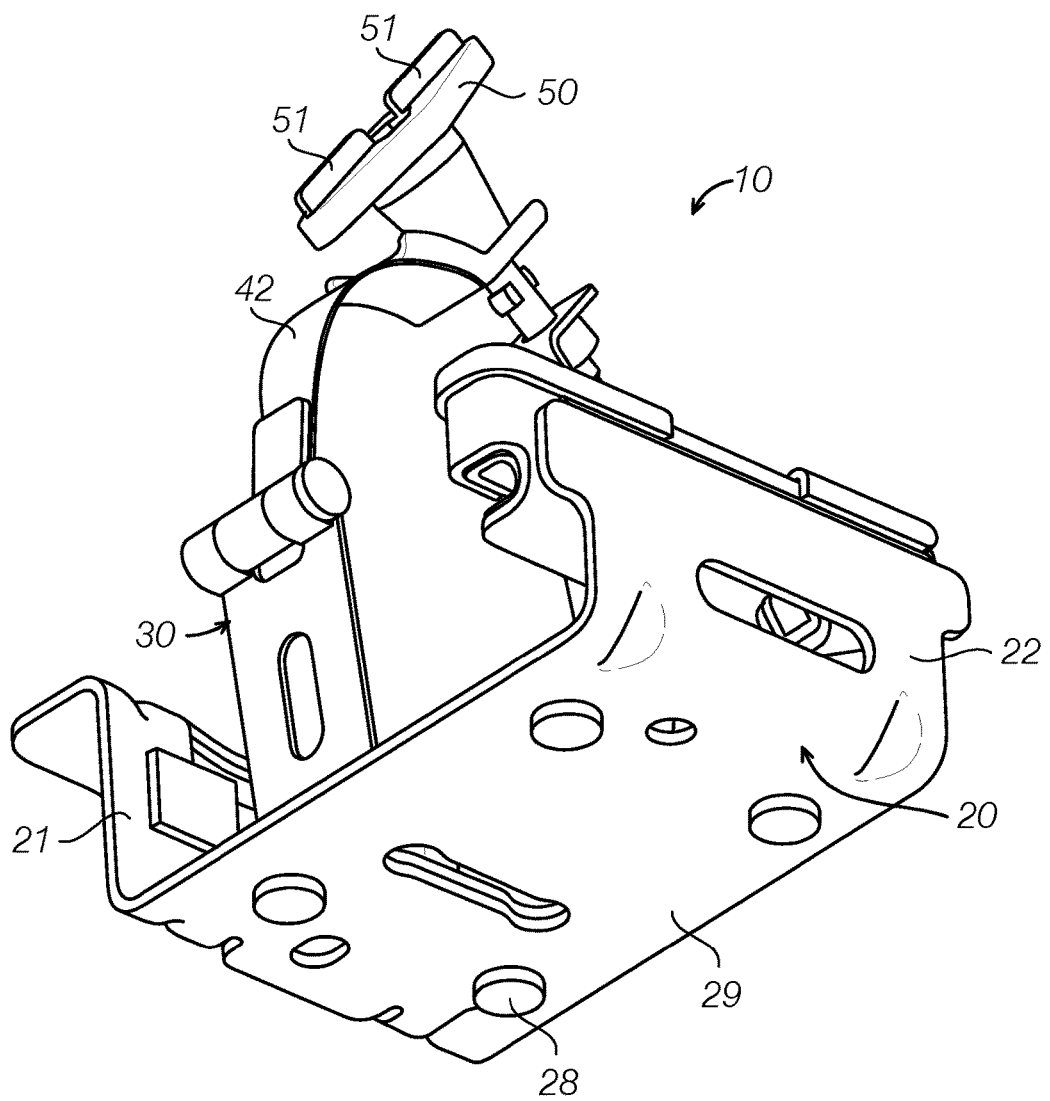
FIG. 5 is a bottom, perspective view of the bracket assembly of FIG. 1.
Figure 6:
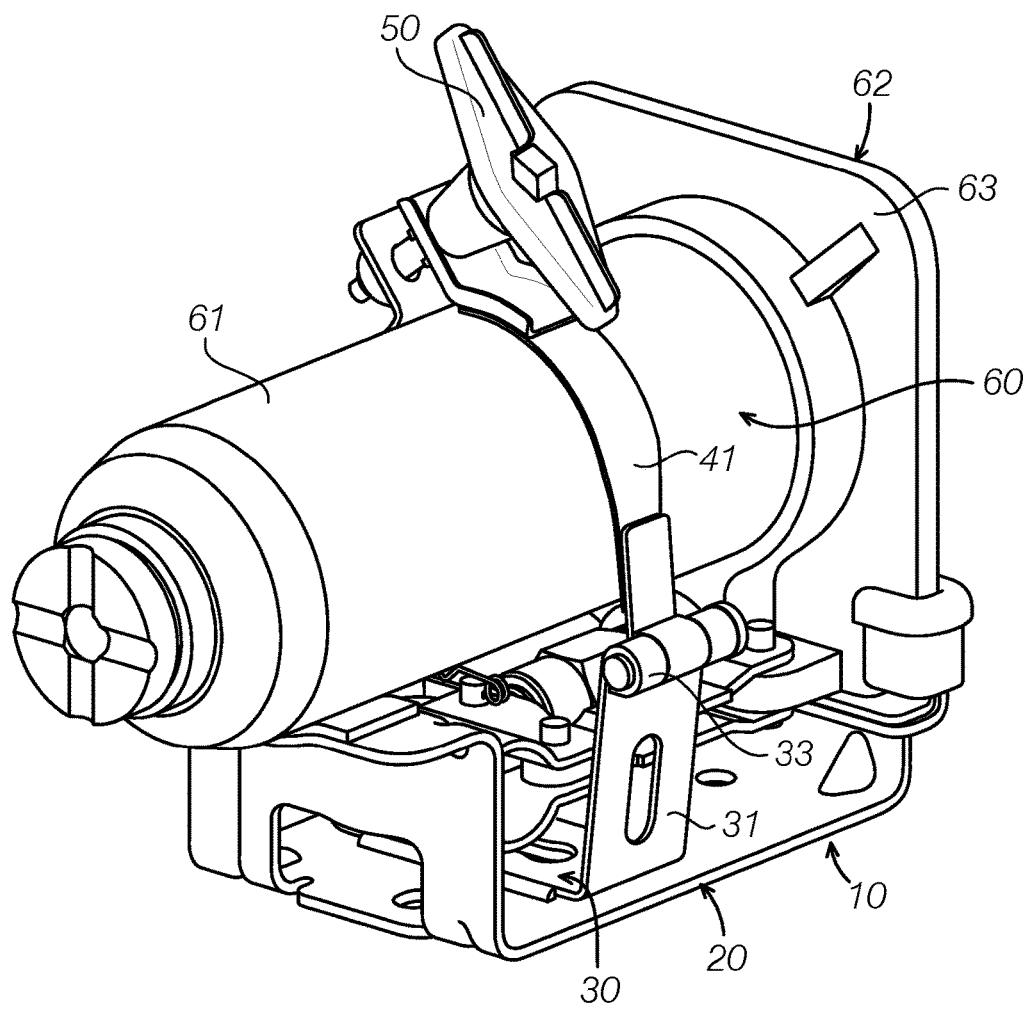
FIG. 6 is a perspective view of the bracket assembly of FIG. 1 showing a hydraulic jack secured therein.

FIGS. 1, 3, 4, 5, and 6 schematically illustrate a bracket assembly 10 for securing a hydraulic jack 60 according to an exemplary embodiment of the invention. As shown in FIG. 6, the jack 60 includes a main body 61 and a base bracket 62 supporting the main body 61. Referring to FIGS. 1 and 6, the bracket assembly 10 includes a base 20, a base band 30 connected to the base 20 and straps 41, 42 for securing the hydraulic jack 60 to the base 20. The bracket assembly 10 further includes a locking device 50 connected to the strap 41 to lock the strap and secure the hydraulic jack 60 on the bracket assembly 10.

The base 20 may be made from metal or other rigid materials, such as hard plastic, and may include two or more support walls 21 and 22. The support walls 21, 22 are opposite each other and extend from a surface 23 of the base 20 to support the hydraulic jack 60.

In one embodiment, the support walls 21, 22 respectively support the main body 61 and base 62 of the hydraulic jack. As shown, an upper portion of the support walls 21 and 22 are configured with a contour substantially matched to a contour of a side surface of the hydraulic jack. For example, an upper surface 27 of the support wall 21 adjacent to the main body 61 or contacting a portion to the hydraulic jack is configured to have a curved shape or arcuate shape corresponding to the contour of a sidewall of the main body 61 of the hydraulic jack 60. The support wall 22 adjacent the base 62 of the hydraulic jack 60 may include an insertion portion 22a at a top portion of the support wall 22. The insertion portion 22a having a groove 25 that receives the base 62 of the hydraulic jack 60. In the depicted embodiment, the base 62 includes a plate 63. The plate 63 is partially inserted into the groove 25 which prevents movement of the hydraulic jack in a horizontal direction; i.e., movement along a direction of a vehicle floor surface. In one or more embodiments, the support wall 22 may include a horizontal flange 22b under the insertion portion 22a to prevent a movement of the base 62 of the hydraulic jack 60 in a direction perpendicular to the horizontal direction. To reduce noise and vibration of the hydraulic jack 60 a cushion layer or cushion pad 26, made from an elastic material, may be disposed on the contact surface the support walls 21, 22. The cushion pad 26 may cover an entire contact surface or a portion of the contact surface.

The base 20 may be connected to the vehicle with any of several approaches, including bolting, riveting, or an adhesive. Further, as shown in FIG. 5, a plurality of cushion pads 28 may be disposed on a bottom surface 29 of the base 20 contacting the vehicle to reduce the vibration and noise during vehicle motion or travel.

Figure 2:
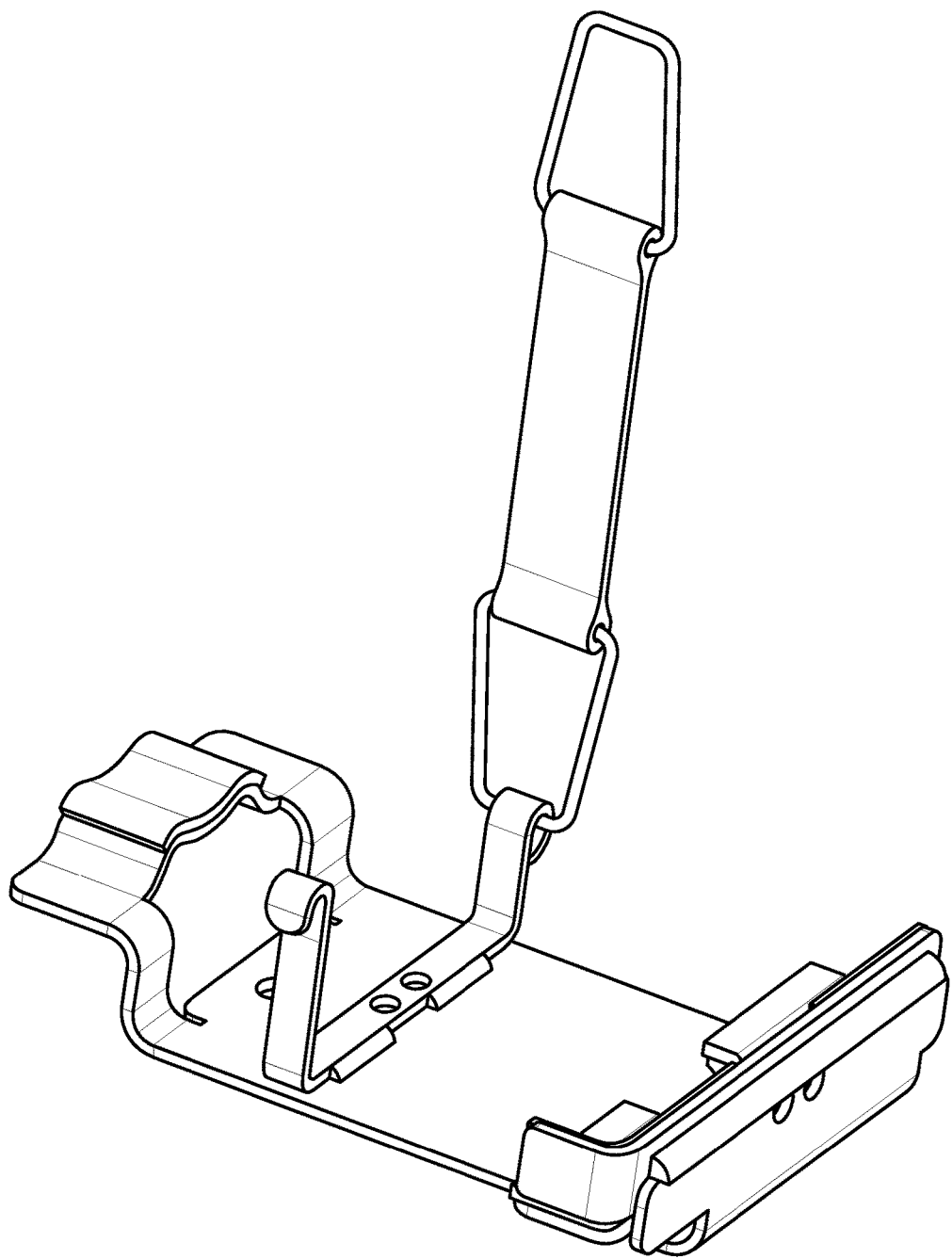
FIG. 2 it is a schematic view of a prior art bracket assembly.
Figure 3:
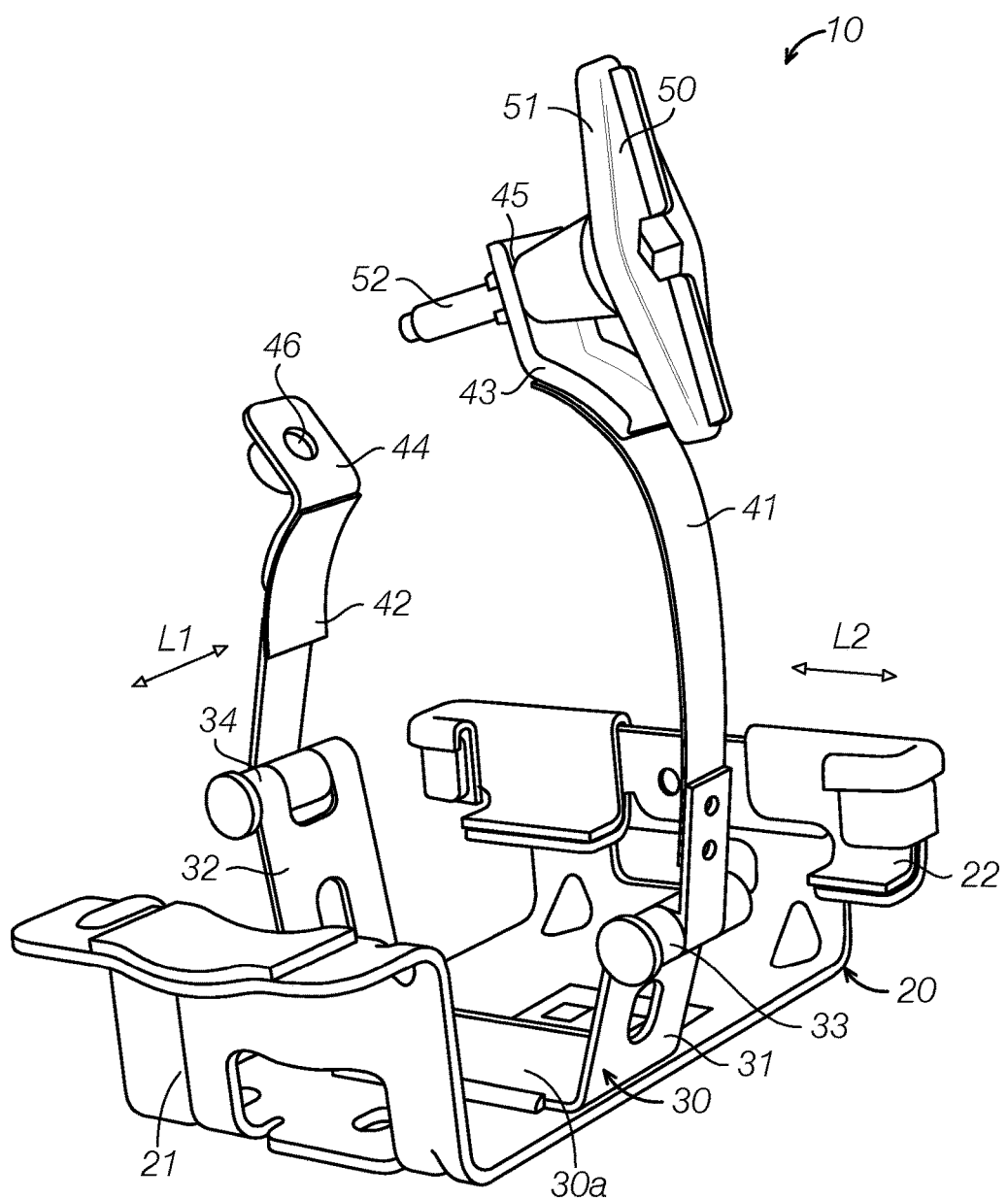
FIG. 3 is a perspective view of the bracket assembly of FIG. 1 illustrating the bracket assembly in an unlocked position.

As shown in FIGS. 1 to 3, the bracket assembly 10 may further include a base band 30 connected to the base 20. The base band 30 may be made from metal or other rigid materials and may be positioned between the support walls 21, 22. The base band 30 may be integrally formed with the base 20 or may be fixed on the base 20 via welding, riveting, or other suitable connection means. In one or more embodiments, the base band 30 may have a U-shape and include a base portion 30a, a first extension arm 31 and a second extension arm 32. The base portion 30a is connected to the base 20 with a lengthwise direction of the base portion 30a substantially parallel to the support walls 21, 22. The first extension arm 31 and the second extension arm 32 extend outwardly from the base 20. A first end 33 and a second end 34 of the base band 30 are respectively positioned on the first extension arm 31 and the second extension arm 32. In some embodiments, the first and second ends 33, 34 of the base band 30 or the first and second extension arms 31, 32 are configured to be substantially perpendicular to the support walls 21, 22 of the base 20. For example, a lengthwise direction L1 of each of the two ends, 33, 34 is substantially perpendicularly to a lengthwise direction L2 of each of the two support walls 21, 22. The first extension arm 31 and the second extension arm 32 providing an operation position and a lock position of the base band 30 wherein it is convenient for a user to lock or unlock the hydraulic jack.

A first end 33 of the base band 30 is pivotally connected to a first strap 41. The first strap 41 may be made from a flexible material having both flexibility and rigidity, such as a metal plate or a flexible metal strap. The metal strap may be made from steel containing manganese such as 65Mn steel. As shown in FIG. 3, in a non-use state, the first strap 41 extends substantially straight or stands upright due to its rigidity. As show in FIGS. 1 and 6, in a use state, to secure the hydraulic jack 60, the first strap 41 bends toward the second end 34 of the base band 30. Because the first strap 41 is made from a material possessing rigidity and generally not expandable, the first strap 41 fastens the hydraulic jack 60 and restrains it from up and down movements resulted from vibration to reduce potential noise and vibration. The first strap 41 includes a fixed end 47 pivotably connected to the first end 33 of the base band 30, and a free end 43. A lock device 50 is disposed on the free end 43 to lock the free end 43 to a second end 34 of the base band 30.

In one embodiment, the first strap 41 may be configured to surround or partially contact a side surface of the hydraulic jack 60 in a locked state. When the first strap 41 is locked with the second end 34 of the base band 30, the hydraulic jack 60 is secured on the support walls 21, 22. In another embodiment, the bracket assembly 10 may further include a second strap 42 having a fixed end 46 and a free end 44. The fixed end 46 of the second strap 42 pivotally connected to the second end 34 of the base band 30 wherein the free end 44 of the second strap 42 pivots relative to the second extension arm 32.

The locking device 50 may lock the free end 43 of the first strap 41 and the free end 44 of the second strap 42 to secure the hydraulic jack 60 on the support walls 21, 22. The first strap 41 and second strap 42 may be configured to have a length to contact and press on the side surface of the main body of the hydraulic jack in a locked state. In some embodiments, the first strap 41 may be configured to be longer than the second strap 42 wherein the lock device 50 is offset toward to the second strap 42. The free end 43 of the second strap 42 may be disposed at a position convenient for a user to lock or unlock the first and second straps 41, 42. In this way, the user can observe the lock device's state or position, and the user's sight or view is not blocked by their hands or other objects. In one embodiment, the second strap 42 may be made from a rigid material. In another embodiment, the second strap 42 may be made from a material having both flexibility and rigidity.

As shown in FIGS. 3 and 4 the lock device 50 may be a screw bolt 50. The screw bolt 50 may include a T-shaped or wing-shaped part 51 for the user to apply a torque to tighten or release the screw bolt 50 during use. The screw bolt may further include a shaft 52 with thread. The free end 43 of the first strap 41 and the free end 44 of the second strap 42 may include locking features such as respective holes 45, 46 corresponding to the screw bolt 50. The holes 45, 46 may have an inner thread. The shaft 52 may go through the holes 45 and 46 to connect the free end 43 of the first strap 41 and the free end 44 of the second strap 42 to secure the hydraulic jack 60. The screw bolt 50 may be preloaded on the free end 43 of the first strap 41. To prevent the screw bolt 50 from falling off the free end 43 of the first strap 41 in the unlocked state, a protrusion 53 may be disposed on the shaft 52 of the bolt 50 wherein a cross-sectional area of the shaft 52 past the protrusion 53 is greater than a diameter of the hole 45 on the free end 43 of the first strap 41.

In another embodiment, the locking device 50 may include a lock tongue and a lock button on the respective free end 43 of the first strap 41 and the free end 44 of the second strap 42, such as an insertion tongue and receiving slot or a buckle and a hole. The free end 43 of the first strap 41 and the free end 44 of the second strap 42 connected via the lock tongue or the lock button.

Figure 7:
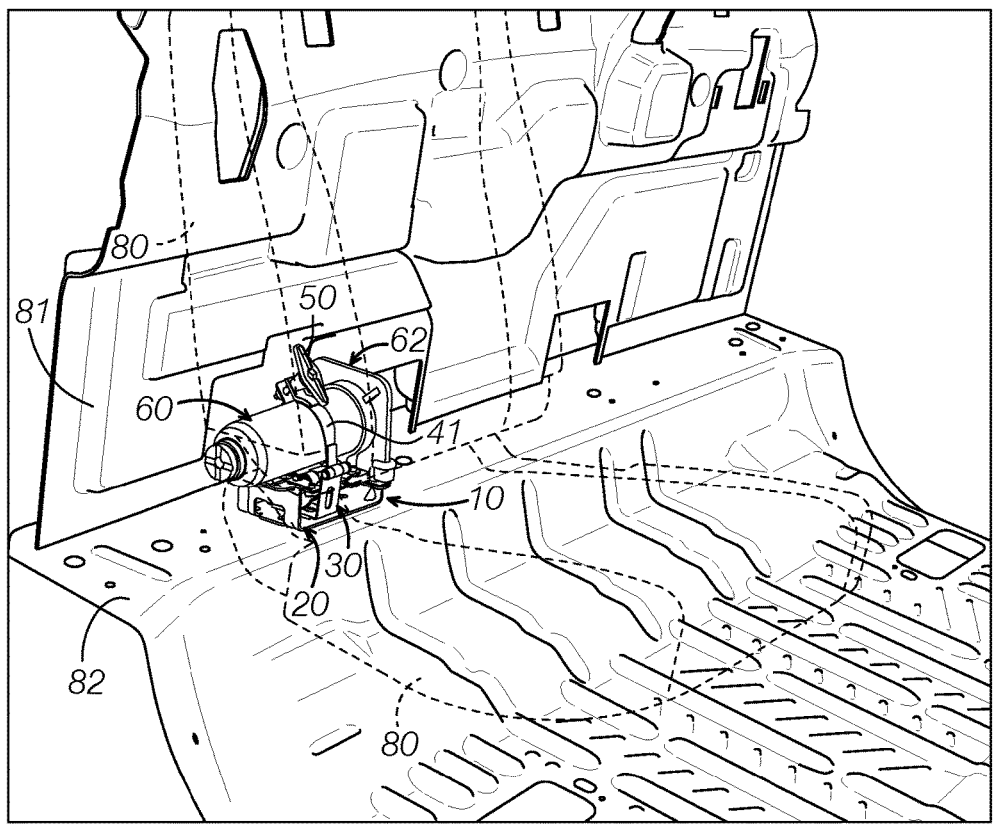
FIG. 7 is a schematic view of an exemplary embodiment of the bracket assembly installed in a vehicle.

The hydraulic jack bracket of the present disclosure can be installed at any appropriate position in a vehicle, such as on a vehicle compartment or a floor in a trunk of the vehicle. In one embodiment, the hydraulic jack bracket assembly 10 is installed on a floor behind a rear seat. As shown in FIG. 7, the hydraulic jack bracket assembly 10 is installed on a floor 82 between a rear seat 80 and a division board 81 for a vehicle trunk. Such arrangement utilizes a space in the vehicle to store the hydraulic jack 60. In one embodiment, the first strap 41 is close to the rear seat 80 and is closer to a user than the second strap 42. In an unlocked state, the first strap 41 maintains a substantially upright position or extends to a position easily reached by a user due to its rigidity. However, the first strap 41 can wrap around a surface of the main body of the hydraulic jack at a locked position due to its flexibility.

It should be understood that the bracket assembly of a hydraulic jack can be installed in multiple positions. For example, underneath a seat or on a floor underneath an instrument panel. Further, it should be appreciated that the bracket assembly of the hydraulic jack can be placed in other places, such as mobile platforms or storage devices.

While the jack bracket assembly of the present invention is suitable for use with a hydraulic jack, it can be used with other types of jacks, especially jacks with relatively heavy weight.

In one or more embodiments, the jack bracket assembly enables placing and taking out a vertically oriented hydraulic jack and reduces NVH concerns related to a horizontally placed hydraulic jack. The bracket assembly of the present disclosure includes a flexible and rigid metal strap to secure the hydraulic jack. The strap is not extendable or deformable when tightening the jack and firmly secures the hydraulic jack. As disclosed the strap can stand upright when the hydraulic jack is removed to simplify the processes of placing and removing the hydraulic jack. In this way, the hydraulic jack bracket assembly restricts movement of the hydraulic jack thereby reducing vibration and noise while enabling convenient removal and replacing of the hydraulic back. The two support walls of the hydraulic jack bracket assembly are configured to restrict a movement of the hydraulic jack in a horizontal direction to further reduce any adverse effects due to the movement of the jack.

The disclosure above encompasses multiple distinct inventions with independent utility. While each embodiment has been disclosed in a particular form, the specific embodiments disclosed and illustrated above are not to be considered in a limiting sense, as numerous variations are possible.

According to one aspect, the bracket assembly secures a hydraulic jack in a vehicle. The bracket assembly including a base, two support walls opposite each other and extending from the base to support the hydraulic jack, a base band having a first end and a second end, and a first strap. The base band is disposed between the two support walls and connected to the base. The first strap is at least partially made of sheet metal and has a fixed end and a free end. The fixed end of the first strap is pivotably connected with the first end of the base band, and the free end is detachably coupled with the second end of the base band via a locking device. The first strap and the base band secures the hydraulic jack on the two support walls.

In one embodiment, the base band may include a first extension arm extending from the base and the first extension arm may have a first end pivotably connected to the first strap. In another embodiment, the bracket assembly may include a second strap pivotably connected to the second end of the base band with a free end of the second strap detachably connected to the free end of the first strap.

In another embodiment, the base band may include a second extension arm extending from the base wherein the second extension arm has a second end that can be pivotably connected to the second strap. The second strap may be at least partially made of sheet metal.

In another embodiment, the locking device may include a screw bolt to connect the free end of the first strap with the free end of the second strap. The screw bolt may include at least one protrusion preventing it from sliding away from the free end of the first strap when the bracket assembly is in an unlocked position. The locking device may also include a latching tongue and a buckle located respectively on the first strap and second strap.

In another embodiment, at least one of the two support walls may include an upper surface configured to have a shape conforming to an outer surface of a hydraulic jack body. The two support walls may further include an elastic layer on at least one portion of the upper surfaces to reduce vibration of the hydraulic jack body.

According to another embodiment, the bracket assembly includes a base, two support walls extending from the base, a base band having a first end and a second end, and a first strap pivotably connected to the first end of the base band, and a second strap pivotably connected to the second end of the base band. The two support walls are opposite each other and configured to support the hydraulic jack. The band is attached to the base and disposed between the two support walls. The first strap is made from a material possessing rigidity and flexibility and is maintained in a substantially upward position when in the non-use position. A free end of the first strap and a free end of the second strap include a lock feature, wherein the first strap and second strap are sized to secure the hydraulic jack on the support two walls by locking the free end of the first arm and the free end of the second arm. The base band may have a U-shape and the first and second ends extend from the base.

The bracket assembly may further include a locking device, and interaction of the locking device with locking features of the first and second straps connects the first and second straps and secures the hydraulic jack. The locking device may include a wing head screw bolt and corresponding holes on the free ends of the respective first and second straps.

As disclosed, the first strap may be a metal strap capable of bending toward the second strap during the process of securing the hydraulic jack. Also, the two support walls may include an elastic layer on an upper surface to reduce vibration of the hydraulic jack. The base band can be attached to an upper surface of the base facing the hydraulic jack. The bracket assembly may further include a plurality of elastic pads disposed on a bottom surface of the base.

According to yet another aspect, the vehicle includes a floor, a rear seat, a hydraulic jack, and a bracket assembly. The bracket assembly including a base fixed to the floor behind the rear seats, a base band, a first strap, and a second strap. The base having two support walls extending from the base to support the hydraulic jack. The base band attached to the base and positioned between the two walls. The first strap is made from metal and pivotably connected to a first end of the base band, and the second strap is pivotably connected to a second end of the base band. A free end of the first strap and a free end of the second strap include a lock feature. The first strap and second strap are sized to secure the hydraulic jack on the two support walls by locking the free ends of first and second straps together. As disclosed, the first end of the band can be spaced further away from a user than the second end of the band.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bracket assembly to secure a hydraulic jack in a vehicle, comprising:
    a base;
    two spaced apart support walls positioned opposite each other and extending from the base to support the hydraulic jack;
    a base band having a first end and a second end, wherein the base band is disposed between the two support walls and connected to the base; and
    a first strap at least partially made of sheet metal, said first strap having a fixed end and a free end, the fixed end pivotably connected with the first end of the base band, and a locking device including a screw bolt having a threaded portion, said screw bolt rotatably secured to the free end of the first strap and threadably engaging the second end of the base band wherein the first strap and the base band operate to contact and hold the hydraulic jack on the two support walls.

2. The bracket assembly of claim 1 wherein the base band includes a first extension arm extending from the base to the first end, said first extension arm pivotally connected to the first strap at said first end.

3. The bracket assembly of claim 1 including a second strap pivotally connected to the second end of the base band and a free end of the second strap detachably connected to the free end of the first strap.

4. The bracket assembly of claim 3 wherein the base band further includes a second extension arm extending from the base to the second end, the second end pivotably connected to the second strap.

5. The bracket assembly of claim 3 wherein the second strap is at least partially made of sheet metal.

6. The bracket assembly of claim 3 wherein the screw bolt engages both the free end of the first strap with the free end of the second strap.

7. The bracket assembly of claim 6 wherein the screw bolt includes at least one protrusion extending outward from a shaft portion maintaining engagement between the free end of the first strap and the screw bolt at an unlocked position.

8. The bracket assembly of claim 1 wherein at least one of the two support walls has an upper surface conforming to an outer surface of the hydraulic jack.

9. The bracket assembly of claim 8 wherein one of the two support walls includes an elastic layer on at least portion of the upper surface to reduce vibration of the hydraulic jack body.

10. A bracket assembly for a hydraulic jack in a vehicle comprising:
    a base,
    two support walls extending from the base, wherein the two support walls are opposite each other and configured to support a hydraulic jack;
    a base band having a first end and a second end, wherein the band is attached to the base and disposed between the two support walls; a first strap pivotably connected to the first end of the base band, wherein the first strap is made from material possessing rigidity and flexibility, and is maintained substantially at an upright position in a non-use position;
    a second strap pivotably connected to the second end of the base band,
    a rotatable fastener disposed between a free end of the first strap and a free end of the second strap, said rotatable fastener securing the free end of the first strap and a free end of the second strap together; and
    wherein the first strap and second strap operate to contact and hold the hydraulic jack on the two support walls by securing the free end of first strap and the free end of the second strap together.

11. The bracket assembly of claim 10 wherein the base band has a U-shape and the first and second ends extend from the base.

12. The bracket assembly of claim 10 wherein the rotatable fastener includes complementary locking features disposed on the first and second straps, the locking features joining the first and second straps.

13. The bracket assembly of claim 12 wherein the rotatable fastener includes a T-shaped head screw bolt on an end of one of said first and second straps and a threaded hole on an end of the other of said first and second straps.

14. The bracket assembly of claim 10 wherein the first strap is a metal strap capable of bending toward the second strap when securing the hydraulic jack.

15. The bracket assembly of claim 10 wherein the two support walls further include an elastic layer on upper surfaces to reduce vibration of the hydraulic jack.

16. The bracket assembly of claim 10 wherein the base band is attached to an upper surface of the base.

17. The bracket assembly of claim 16 further comprising a plurality of elastic pads disposed on a bottom surface of the base.

18. A vehicle with a hydraulic jack bracket assembly comprising:
    a floor;
    a rear seat;
    a hydraulic jack;
    a bracket assembly having a base fixed to the floor behind the rear seats, two support walls extending from the base to support the hydraulic jack, a base band attached to the base and disposed between the two support wall walls;
    a first strap made from a metal and pivotably connected to a first end of the base band, and a second strap pivotably connected to a second end of the base band; and
    a rotatable fastener engaging and securing together both a free end of the first strap and a free end of the second strap wherein the first strap and the second strap are sized to secure the hydraulic jack on the two support walls by securing the free end of the first strap and the free end of the second straps together.

19. The bracket assembly of claim 18 wherein the first strap is longer than the second strap, and wherein the first strap is closer to the rear seat than the second strap.

* * * * *